(12) United States Patent
Neves et al.

(10) Patent No.: US 11,030,376 B2
(45) Date of Patent: Jun. 8, 2021

(54) NET ROUTING FOR INTEGRATED CIRCUIT (IC) DESIGN

(71) Applicant: International Business Machines Corporation, Armonk, NY (US)

(72) Inventors: Jose Neves, Poughkeepsie, NY (US); Adam Matheny, Hyde Park, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1 day.

(21) Appl. No.: 16/567,035

(22) Filed: Sep. 11, 2019

(65) Prior Publication Data
US 2021/0073347 A1    Mar. 11, 2021

(51) Int. Cl.
| G06F 9/45 | (2006.01) |
| G06F 30/394 | (2020.01) |
| G06F 30/327 | (2020.01) |
| G06F 30/398 | (2020.01) |
| G06F 111/04 | (2020.01) |
| G06F 111/20 | (2020.01) |

(52) U.S. Cl.
CPC .......... *G06F 30/394* (2020.01); *G06F 30/327* (2020.01); *G06F 30/398* (2020.01); *G06F 2111/04* (2020.01); *G06F 2111/20* (2020.01)

(58) Field of Classification Search
USPC .................. 716/102, 103, 104, 105, 108
See application file for complete search history.

(56) References Cited

U.S. PATENT DOCUMENTS

| 6,230,304 | B1 | 5/2001 | Groeneveld et al. |
| 6,440,780 | B1 | 8/2002 | Kimura et al. |
| 6,449,759 | B1 | 9/2002 | Whitney et al. |
| 6,701,507 | B1 | 3/2004 | Srinivasan |
| 6,769,104 | B2 | 7/2004 | Rodgers et al. |
| 7,051,310 | B2 | 5/2006 | Tsao et al. |
| 7,356,785 | B2 | 4/2008 | Lu et al. |
| 7,411,425 | B2 | 8/2008 | Belluomini et al. |
| 7,418,641 | B2 | 8/2008 | Drake et al. |
| 7,549,137 | B2 | 6/2009 | Alpert et al. |
| 7,551,985 | B1 | 6/2009 | Chen et al. |
| 7,598,774 | B2 | 10/2009 | Belluomini et al. |

(Continued)

OTHER PUBLICATIONS

Transmittal Form PTO/SB/21 signed Mar. 16, 2020.

(Continued)

*Primary Examiner* — Brian Ngo
(74) *Attorney, Agent, or Firm* — Cantor Colburn LLP; William Kinnaman

(57) ABSTRACT

Techniques for net routing for an integrated circuit (IC) design are described herein. An aspect includes receiving a netlist corresponding to a net in an IC design. Another aspect includes identifying intermediate logic in the net, wherein the intermediate logic is connected between a source and a sink of the net, and wherein the sink is located downstream from the source in the IC design. Another aspect includes hiding the intermediate logic from the netlist. Another aspect includes creating a global route in the IC design between the source and the sink of the net without the intermediate logic. Another aspect includes restoring the intermediate logic to the netlist. Another aspect includes placing the intermediate logic along the global route.

20 Claims, 6 Drawing Sheets

(56) References Cited

U.S. PATENT DOCUMENTS

| | | |
|---|---|---|
| 7,624,366 B2 | 11/2009 | Alpert et al. |
| 7,653,884 B2 | 1/2010 | Furnish et al. |
| 7,685,552 B2 | 3/2010 | Ishihara et al. |
| 7,795,943 B2 | 9/2010 | Toyonoh et al. |
| 7,917,880 B2 | 3/2011 | Mak et al. |
| 8,010,926 B2 | 8/2011 | Alpert et al. |
| 8,104,014 B2 | 1/2012 | Puri et al. |
| 8,205,182 B1 | 6/2012 | Zlatanovici et al. |
| 8,490,039 B2 | 7/2013 | Agrawal et al. |
| 8,495,552 B1 | 7/2013 | Cho et al. |
| 8,661,374 B2 | 2/2014 | Vishweshwara et al. |
| 8,661,391 B1 | 2/2014 | Viswanath et al. |
| 8,667,441 B2 | 3/2014 | Alpert et al. |
| 8,677,299 B1 | 3/2014 | Alpert et al. |
| 8,826,211 B1 | 9/2014 | Sood et al. |
| 8,832,626 B2 | 9/2014 | Agrawal et al. |
| 8,904,255 B2 | 12/2014 | Tekumalla et al. |
| 8,954,912 B2 | 2/2015 | Alpert et al. |
| 8,966,425 B1 | 2/2015 | Eisenstadt et al. |
| 9,135,375 B1 | 9/2015 | Sood et al. |
| 9,411,912 B1 | 8/2016 | Sood et al. |
| 9,792,398 B2 | 10/2017 | Xu et al. |
| 10,417,375 B2 | 9/2019 | Chung et al. |
| 2001/0010090 A1 | 7/2001 | Boyle et al. |
| 2003/0135836 A1 | 7/2003 | Chang et al. |
| 2004/0230933 A1 | 11/2004 | Weaver et al. |
| 2006/0041852 A1 | 2/2006 | Drumm et al. |
| 2008/0148203 A1* | 6/2008 | Alpert ............... G06F 30/392 716/114 |
| 2008/0168411 A1 | 7/2008 | Mang et al. |
| 2008/0276212 A1 | 11/2008 | Albrecht |
| 2010/0064264 A1 | 3/2010 | Amundson |
| 2011/0137602 A1* | 6/2011 | Desineni ............. G06F 11/261 702/117 |
| 2012/0124539 A1* | 5/2012 | Alpert ............... G06F 30/327 716/114 |
| 2012/0242401 A1* | 9/2012 | Siragusa ............. H02M 3/073 327/536 |
| 2013/0326451 A1 | 12/2013 | Cho et al. |
| 2014/0070847 A1 | 3/2014 | Elkin et al. |
| 2014/0084890 A1 | 3/2014 | Philip |
| 2016/0188774 A1* | 6/2016 | Adya ................. G06F 30/3312 716/108 |
| 2017/0323030 A1 | 11/2017 | Datta et al. |

OTHER PUBLICATIONS

Held, S. et al., "Post-Routing Latch Optimization for Timing Closure," Research Institute for Discrete Mathematics, Bonn, Germany, 6 pages.

IBM "List of IBM Patents or Patent Applications Treated As Related; (Appendix P)", Filed Sep. 11, 2019, 2 pages.

Jesse Surprise et al., "Improved Clock Gating Latch Placement," U.S. Appl. No. 16/567,134, filed Sep. 11, 2019.

Jesse Surprise et al., "Improved Local Clock Buffer Controller Placement and Connectivity," U.S. Appl. No. 16/567,128, filed Sep. 11, 2019.

Jose Neves et al., "Multi-Fanout Latch Placement Optimization for Integrated Circuit (IC) Design," U.S. Appl. No. 16/567,050, filed Sep. 11, 2019.

Jose Neves et al., "Single-Bit Latch Optimization for Integrated Circuit (IC) Design," U.S. Appl. No. 16/567,031, filed Sep. 11, 2019.

Jung, J. et al., "Integrated Latch Placement and Cloning for Timing Optimization," ACM Transactions on Design Automation of Electronic Systems, Feb. 2019, vol. 24, No. 2, Article 22, 17 pages.

MacQueen et al., "Some Methods for classification and Analysis of Multivariate Observations," Proceedings of 5th Berkeley Symposium on Mathematical Statistics and Probability, University of California Press, 1967, pp. 281-297.

Papa, D. et al., "Physical Synthesis With Clock-Network Optimization for Large Systems on Chips," IEEE Computer Society, Jul./Aug. 2011, Big Chips, 12 pages.

Viswanathan, "Placement techniques for the physical synthesis of nanometer-scale integrated circuits," Iowa State University, Graduate Theses and Dissertations, 20758, 2009, 160 pages.

* cited by examiner

NET ROUTING FOR INTEGRATED CIRCUIT (IC) DESIGN

BACKGROUND

The present invention generally relates to integrated circuits (ICs), and more specifically, to net routing for an IC design.

An IC chip may include a large number of electronic components that are fabricated by layering several different materials on a silicon base or wafer. The design of an IC transforms a circuit description into a geometric description which is known as a layout. The process of converting the functional specifications of an electronic circuit into a layout is called the physical design. The objective of physical design is to determine an optimal arrangement of devices in a plane or in a three-dimensional space, and an efficient interconnection or routing scheme between the devices to obtain the desired functionality.

An IC chip includes elements, and connections between the elements, formed on a surface of a semiconductor substrate. The IC may include a large number of elements and require complex connections between the elements. Millions of circuits may need to be physically placed and connected on the chip. Placement may be a relatively time consuming process because the actual process of designing, placing, and connecting the circuits on the chip can affect the performance and timing requirements of the chip. Therefore, the design process may be automated by using a computer place and wire circuits into a functional chip. However, automation may sacrifice the performance of the resulting IC chip for the ability to determine a connected circuit in a reasonable amount of computing time.

SUMMARY

Embodiments of the present invention are directed to net routing for an integrated circuit (IC) design. A non-limiting example computer-implemented method includes receiving a netlist corresponding to a net in an IC design. The method also includes identifying intermediate logic in the net, wherein the intermediate logic is connected between a source and a sink of the net, and wherein the sink is located downstream from the source in the IC design. The method also includes hiding the intermediate logic from the netlist. The method also includes creating a global route in the IC design between the source and the sink of the net without the intermediate logic. The method also includes restoring the intermediate logic to the netlist. The method also includes placing the intermediate logic along the global route.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
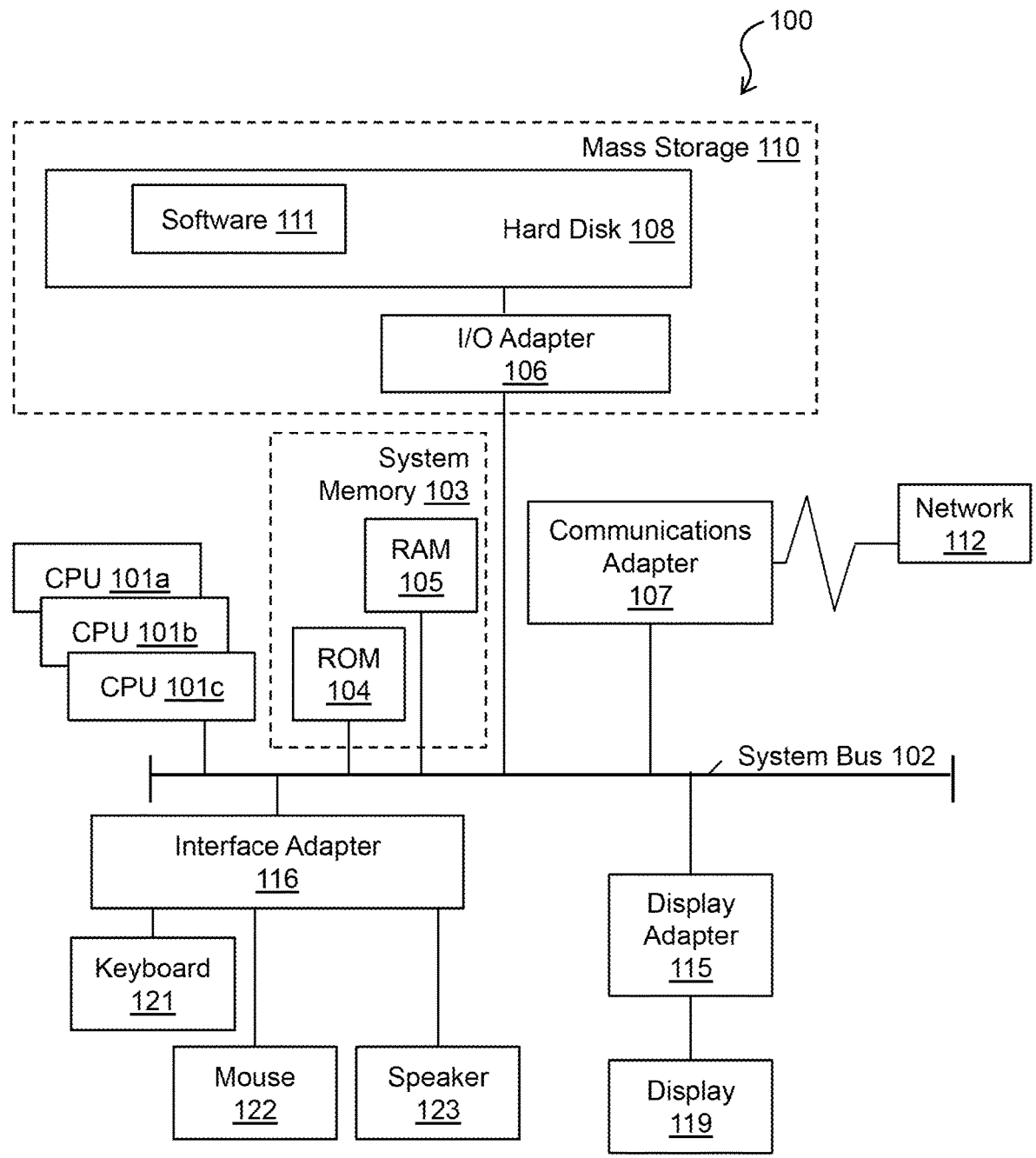
FIG. 1 is a block diagram of an example computer system for use in conjunction with one or more embodiments of net routing for an integrated circuit (IC) design.

One or more embodiments of the present invention provide net routing for an integrated circuit (IC) design. An IC may include a relatively large number of nets, each net being described by a netlist in the IC design. Routing of a net in an IC design includes placement of logic gates along a route between the net endpoints (e.g., a source and one or more sinks). The route may be generated between endpoints that are not in the same logic level. In order to generate a route, intermediate logic in the net may be hidden from the netlist in the IC design, and a global route may be created between a source and a sink without the intermediate logic. The hidden logic may then be unhidden and placed along the global route. The hidden logic may include a sequence of latches in some embodiments, as latches may be present in the netlist prior to physical design.

Embodiments of routing for IC design may provide routing solutions that comply with timing requirements. Rerouting may be performed to improve timing using an existing netlist. A netlist including a number of latches and a route connecting a source to a sink may be received. The route between the source and the sink may be detached by temporarily disconnecting (or hiding connectivity) any logic gates, such as latches, that are located between the source and a given sink (which may be located in one or more levels downstream from the source). Therefore, in some embodiments, the intermediate logic may include paths containing one or more latches. After disconnecting the latches, the net connected to the source may be connected to the given sink and any intermediate latches and driving nets are temporarily removed from the design. A global route may then be created for the net connecting a source to a downstream sink that takes wiring limitations and numbers of lanes available in the IC design into account. After routing, the removed latches and nets are added back to the netlist, using the created route as guidance for latch placement. The latches may then be legally placed on the global route in a manner than reduces congestion and delay in the IC.

Multiple levels of logic may be identified and hidden from a netlist to enable routing between a source and a sink. The source may be in a first logic level and the sink (or sinks)

may be in one or multiple different logic levels downstream. The logic levels to be temporarily hidden are identified (e.g., by saving of latch names), such that connectivity is preserved, and are removed from the netlist. The same names may be maintained for the latches during hiding and unhiding, and when placing the latches in the global route, in order to maintain latches as part of the original netlist. A global route is then determined as if the source and sinks are directly connected, without the hidden logic. The global route is defined by the location of the source and the sink. Therefore, the global route may take a best path chosen by the router. For example, the global route may extend through available wiring in a hierarchical block in the IC, in which the latches may not be placed. Once the global route is created the hidden logic is added back to the netlist. The global route may be manipulated such that portions of the route are added to appropriate respective logic level nets in order to accommodate the unhidden intermediate logic. Placement of latches or other removed logic is performed on the original netlist using the global route. Latches may be moved along the global route to determine an appropriate location for each latch based on timing and delay constraints (e.g., to ensure balanced latches), while keeping the latches in the same order as in the original route from the netlist.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
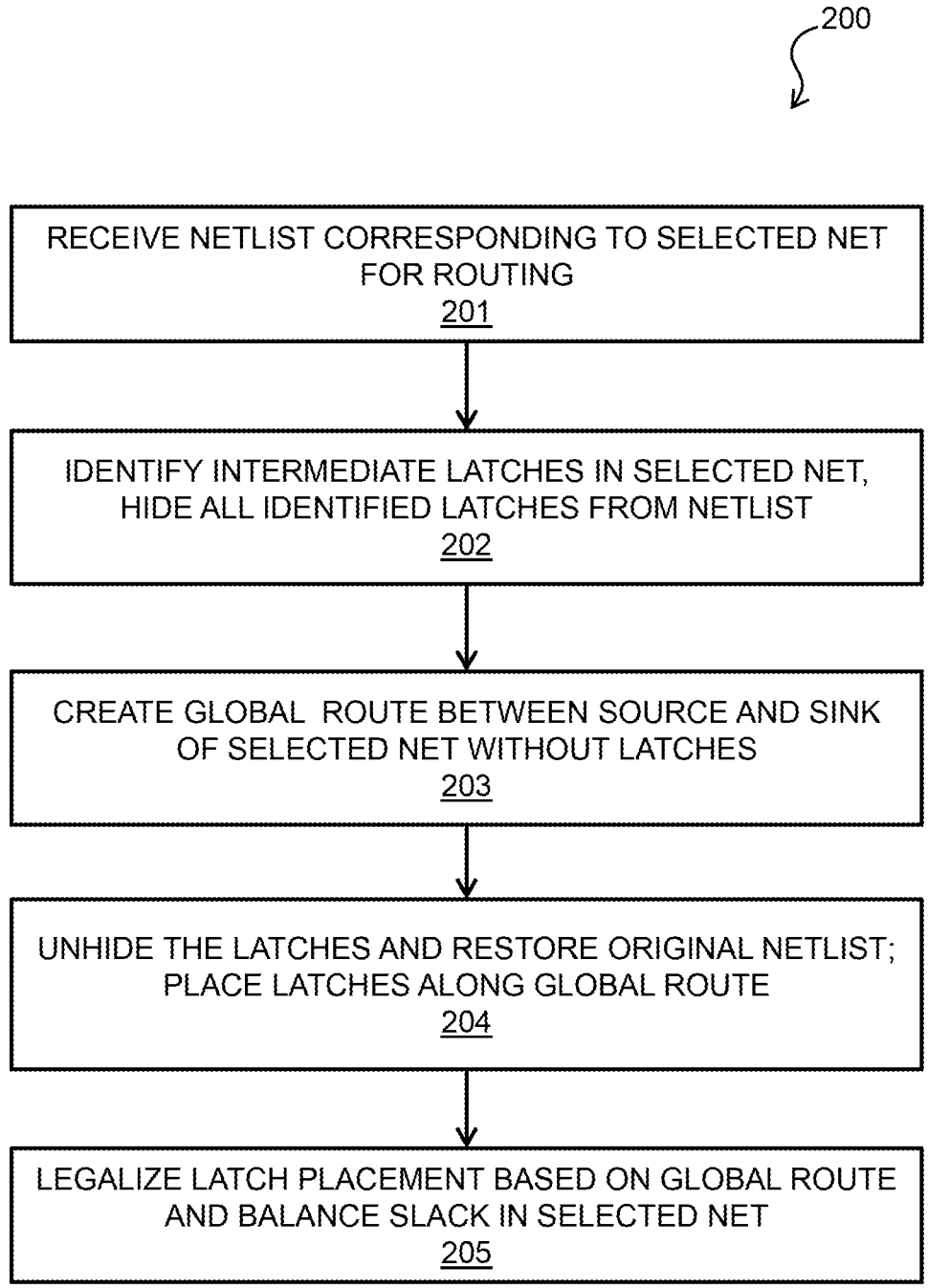
FIG. 2 is a flow diagram of a process for net routing for an IC design in accordance with one or more embodiments of the present invention.

FIG. 2 shows a process flow diagram of a method 200 for net routing for an IC design in accordance with one or more embodiments of the present invention. Method 200 of FIG. 2 may be implemented in conjunction with any appropriate computer system, such as computer system 100 of FIG. 1. Embodiments of method 200 may be implemented in software 111, and may operate on data stored in mass storage 110 and/or system memory 103. In block 201 of method 200, a netlist corresponding to a selected net from an IC design is received. The IC design may include a plurality of nets including the selected net. The net may include endpoints (i.e. a source and one or more sinks), and any appropriate number and type of intermediate components, including but not limited to latches. The source may be in a first logic level of the IC design, and the sink (or sinks) may be in one or multiple different logic levels downstream in the IC design in some embodiments. In block 202, any intermediate latches located between the source and the sink in the selected net are identified and hidden from the netlist. For each hidden latch, a name of the latch and the network connectivity of the latch may be saved in block 202 based on the latch being removed from the netlist.

In block 203, a global route is determined directly between the source and the sink(s) in the IC design using any available wire tracks in the IC design. The global route may take wiring limitations and numbers of lanes available in the IC design into account. The global route may extend through a hierarchical object, like a unit, a macro, or an intellectual property (IP) unit in the IC design. The hierarchical object may include gates that are configured such that additional gates or latches may not be able to be placed inside the hierarchical object. The hierarchical object may be described as a placement blockage in the IC design. For a current level of the hierarchy, the hierarchical object may be a forbidden area where no gate is permitted to be placed.

In block 204, the latches that were hidden from the netlist in block 202 are unhidden and added back to the netlist of the selected net (i.e., the original netlist is restored). The latches are then placed along the global route that was determined in block 203. The latches are reconnected to the netlist in order based on the latch names and connectivity that were saved in block 202. The global route may be divided into a number of segments corresponding to a number of latches in the net, and a segment may be assigned to the net driven by each latch. In block 205, the placement of the latches on the global route is legalized, and slack in the net is balanced. A multi-dimensional optimization algorithm may be used in block 205 to move the latches to legal positions, in order to meet timing constraints and balance slack amongst the latches. The latches may be moved along the global route to legal positions if the global route may be preserved while meeting timing constraints. If the global route may not be preserved, the global route may be modified as needed in block 205 to meet timing constraints and balance slack in the net, and the latches may be moved along Steiner distances to legal positions.

Method 200 of FIG. 2 may be repeated for any appropriate number of nets in an IC design. When it is determined that all nets in the IC design are appropriately routed (for example, according to method 200 of FIG. 2), a physical chip may be fabricated based on the IC design. Fabrication of a physical chip based on the IC design is discussed in further detail below with respect to FIG. 4.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3A:
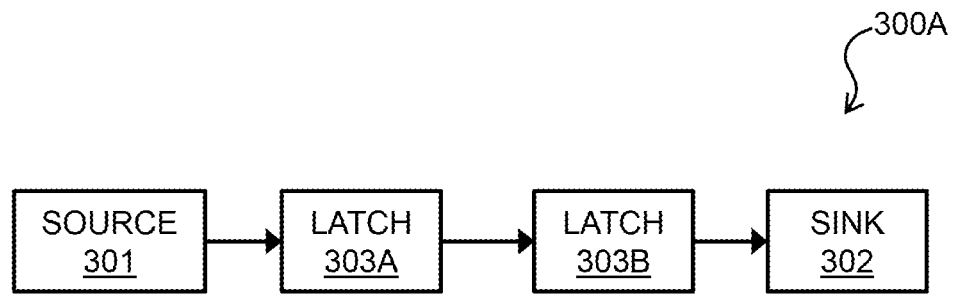
FIG. 3A is a block diagram of components of a system for net routing for an IC design in accordance with one or more embodiments of the present invention.
Figure 3B:
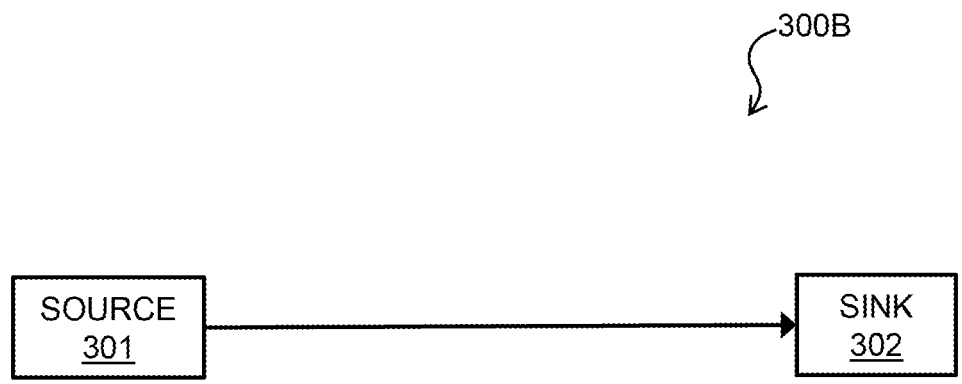
FIG. 3B is a block diagram of components of a system for net routing for an IC design in accordance with one or more embodiments of the present invention.
Figure 3C:
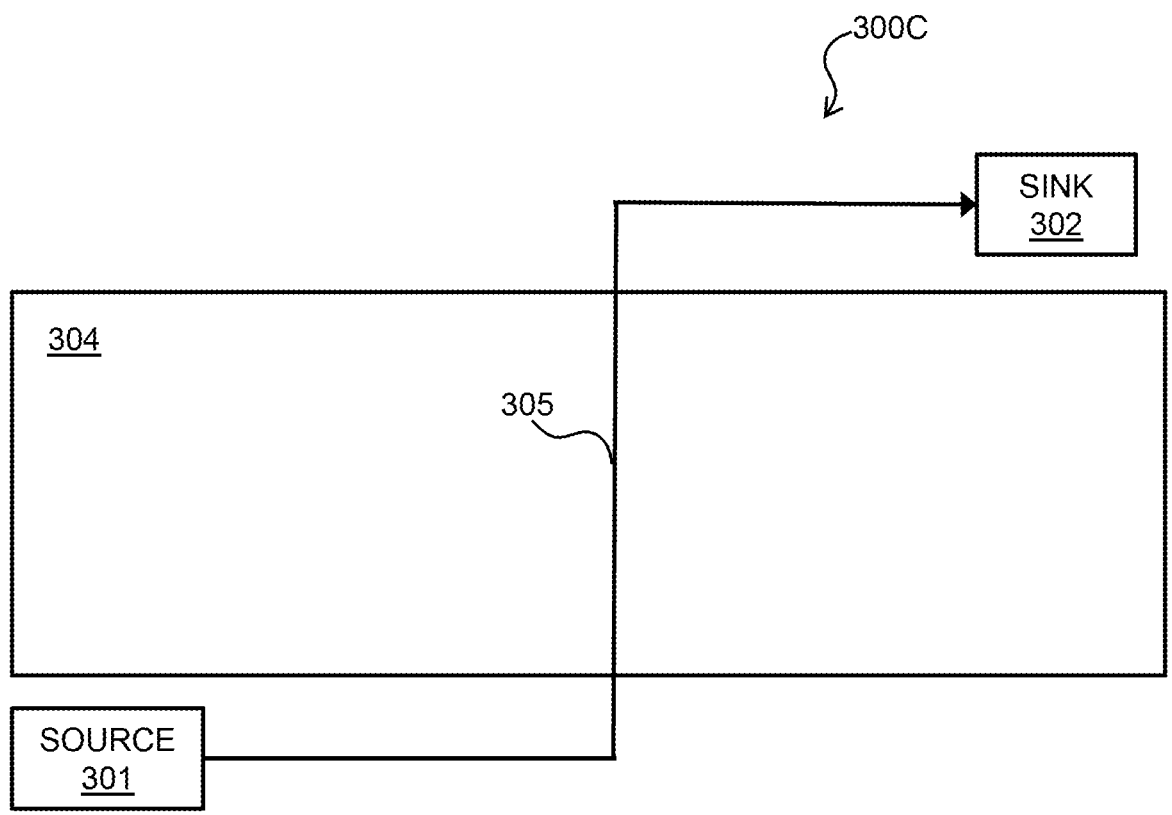
FIG. 3C is a block diagram of components of a system for net routing for an IC design in accordance with one or more embodiments of the present invention.

FIGS. 3A-D show block diagrams of components of systems 300A-D for net routing for an IC design in accordance with one or more embodiments of the present invention. FIGS. 3A-D are discussed with reference to method 200 of FIG. 2. System 300A of FIG. 3A illustrates an embodiment of a selected net that may be received in block 201 of method 200. The system 300A includes a source 301, sink 302, and intermediate logic comprising latches 303A-B. System 300B of FIG. 3B illustrates removal of the intermediate latches 303A-B from the selected net, as is performed in block 202 of FIG. 2. As shown in FIG. 3B, source 301 and sink 302 are directly connected. Information regarding the intermediate latches 303A-B, including names and connectivity, may be saved based on hiding of the intermediate latches 303A-B. System 300C of FIG. 3C illustrates an embodiment of creation of a global route 305 that connects with source 301 to the sink 302 in the IC design without the intermediate latches 303A-B, according to block 203 of FIG. 2. As shown in system 300C, the global route 305 includes available wiring that is located over, but outside of, a hierarchical object 304 of the IC design, which may represent but is not limited to a unit, a macro, or an IP unit in the IC design. In some embodiments, the global route may extend through the hierarchical object if the hierarchical object has available wiring tracks that are visible from the outside of the hierarchical object. The hierarchical object 304 may include any appropriate number of gates located inside the object, such that additional gates or latches may not be able to be placed inside the hierarchical object 304.

Figure 3D:
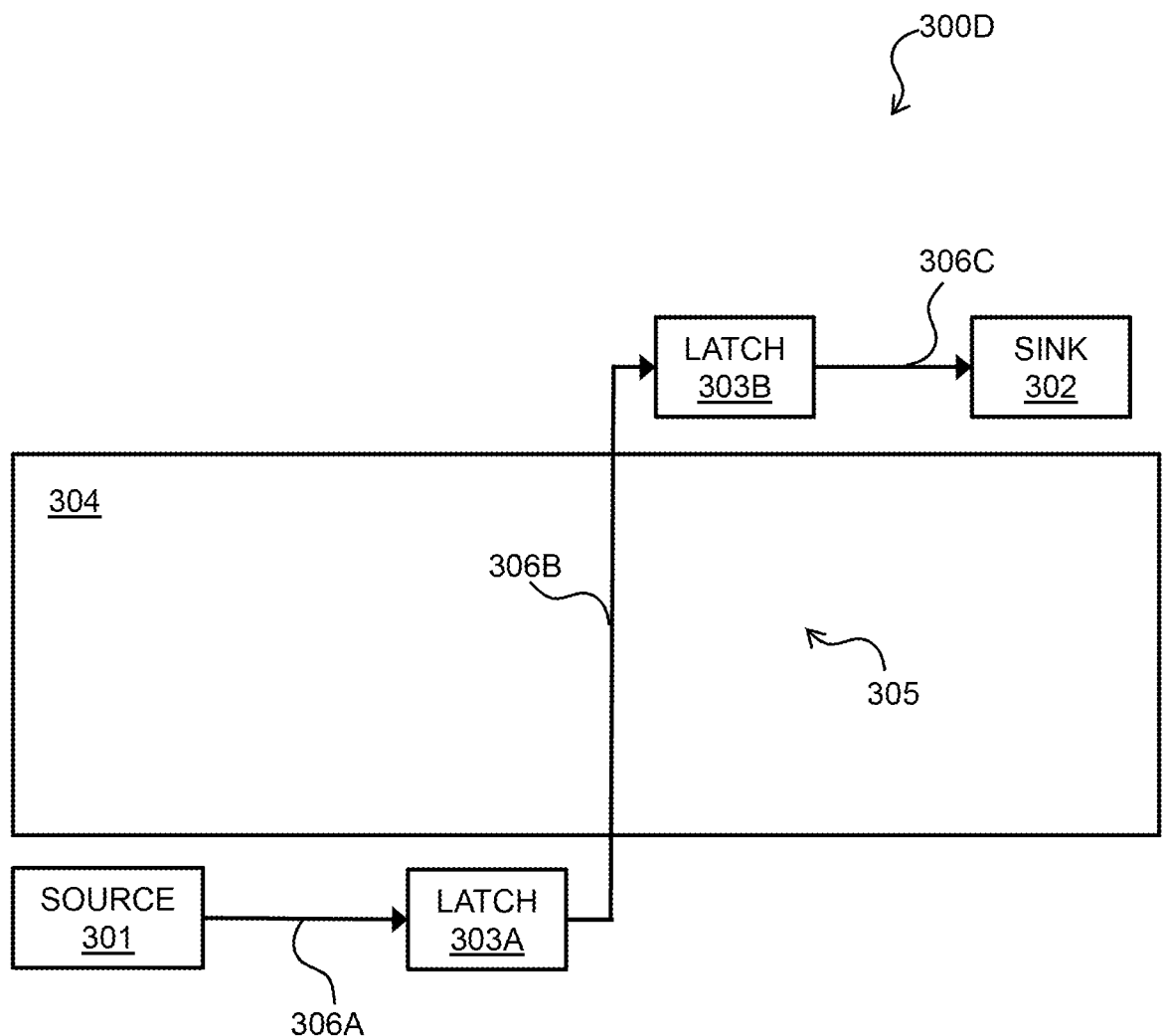
FIG. 3D is a block diagram of components of a system for net routing for an IC design in accordance with one or more embodiments of the present invention.

System 300D of FIG. 3D illustrates an embodiment of latch placement according to blocks 204 and 205 of FIG. 2. The latches 303A-B are added back into the netlist of the selected net and placed along the global route 305, based on global route segments 306A-C, which correspond to, or form, global route 305. The placement of the latches 303A-B on the global route segments 306A-C is legalized, and slack in the net is balanced. A multi-dimensional optimization algorithm may be used to move the latches to legal positions along the global route 305 (by, for example, modifying the lengths of any of global route segments 306A-C), in order to meet timing constraints and balance slack amongst the latches in the net. A longer global route segment between two latches may correspond to higher slack. The latches may be moved along the global route 305 to legal positions if the global route may be preserved while meeting timing constraints. If the global route 305 may not be preserved, the global route may be modified as needed (e.g., by changing the lengths of any of global route segments 306A-C) to meet timing constraints and balance slack in the net, and the latches may be moved along Steiner distances to legal positions.

It is to be understood that the block diagrams of FIGS. 3A-D are not intended to indicate that the systems 300A-D are to include all of the components shown in FIGS. 3A-D. Rather, the systems 300A-D can include any appropriate fewer or additional components not illustrated in FIGS. 3A-D (e.g., nets, sources, sinks, intermediate logic, latches, IC components, global routes, global route segments, hierarchical objects, additional memory components, embedded controllers, functional blocks, connections between functional blocks, modules, inputs, outputs, etc.). Further, the embodiments described herein with respect to systems 300A-D may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
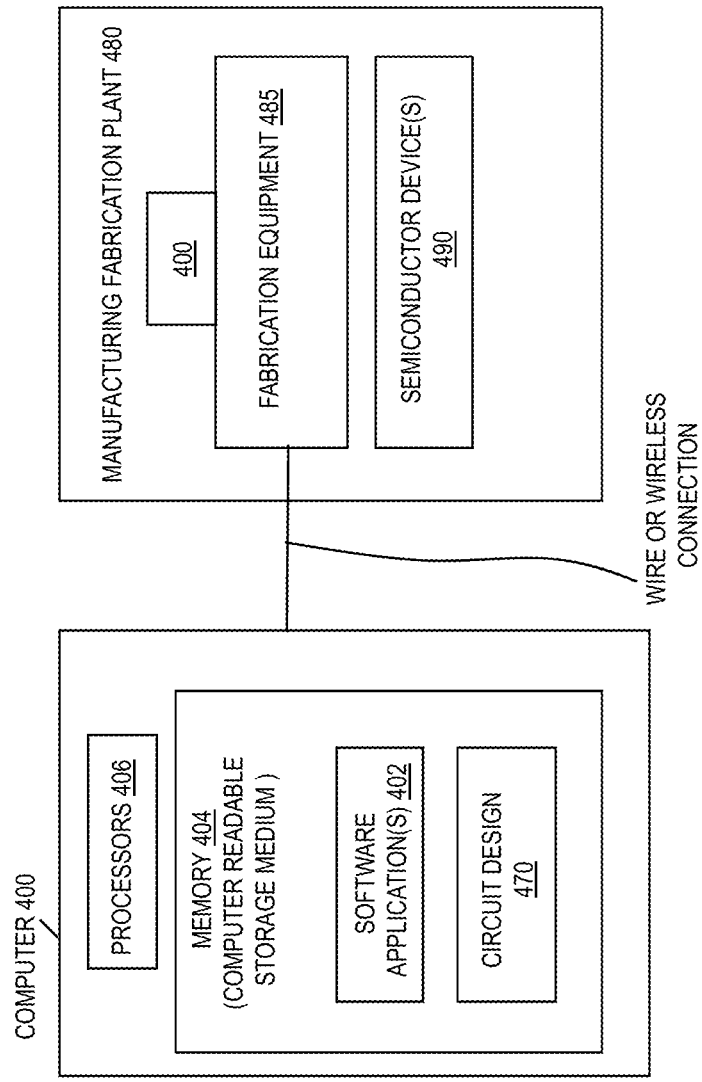
FIG. 4 depicts a system of a computer system integrated with a manufacturing fabrication plant according to embodiments of the invention.

In some embodiments, a semiconductor layout (or IC design) can be generated using the computer system 400 shown in FIG. 4. The computer system 400 has one or more software applications 402 configured to function and implement operations as discussed herein. For example, software applications 402 may include one or more routines for net routing for an IC design. A semiconductor layout can be constructed by the software application 402 of the computer 400 according to method 200 of FIG. 2 as described above to build the semiconductor device (e.g., an integrated circuit). The computer 400 is configured to guarantee design rule cleanliness (i.e., pass) for the semiconductor device before and/or without requiring a design rule check. The software applications 402 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 400 is coupled to, integrated with, and/or part of the fabrication equipment 485 at the manufacturing fabrication plant 480 (so as to communicate with and/or control operations of the fabrication equipment 485) to thereby fabricate semiconductor device(s) 490 as depicted in FIG. 4, as understood by one skilled in the art. The computer 400 includes one or processors 406 configured to execute one or more software applications 402 in memory 404. The computer 400 receives input of a design 470 for the semiconductor device 490, and the computer 400 is configured to develop/form the semiconductor layout for the semiconductor device in order to build the semiconductor device. The semiconductor layout is a physical design released to the manufacturing fabrication (Fab) plant 480 and physically fabricated by the fabrication equipment 485 to produce the semiconductor device 490. The manufacturing fabrication plant 480 builds the photo mask from the semiconductor layout as a physical design, and then builds the actual product using the photo mask. The product is an integrated circuit (i.e., semiconductor device 490) on a wafer according to the semiconductor layout (physical design). There may be numerous integrated circuits on a wafer, and each integrated circuit may be diced into an individual chip.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a netlist corresponding to a net in an integrated circuit (IC) design;
   identifying intermediate logic in the net, wherein the intermediate logic is connected between a source and a sink of the net, and wherein the sink is located downstream from the source in the IC design;
   disconnecting the intermediate logic from the netlist;
   creating a global route in the IC design between the source and the sink of the net without the disconnected intermediate logic;
   based on creation of the global route, reconnecting the intermediate logic in the netlist; and
   placing the reconnected intermediate logic along the global route.

2. The method of claim 1, wherein the intermediate logic comprises a plurality of latches.

3. The method of claim 2, wherein disconnecting the intermediate logic from the netlist comprises saving a name and a connectivity of each latch of the plurality of latches.

4. The method of claim 2, wherein placing the reconnected intermediate logic along the global route comprises dividing the global route into a number of global route segments corresponding to a number of the plurality of latches.

5. The method of claim 1, wherein the global route extends through available wiring in a hierarchical block of the IC design, and wherein the intermediate logic cannot be placed inside of the hierarchical block.

6. The method of claim 1, wherein placing the reconnected intermediate logic along the global route comprises legalizing placement of the intermediate logic based on slack in the IC design.

7. The method of claim 1, further comprising creating a respective global route for each of a plurality of nets in the IC design.

8. A system comprising:
   a memory having computer readable instructions; and
   one or more processors for executing the computer readable instructions, the computer readable instructions controlling the one or more processors to perform operations comprising:
      receiving a netlist corresponding to a net in an integrated circuit (IC) design;
      identifying intermediate logic in the net, wherein the intermediate logic is connected between a source and a sink of the net, and wherein the sink is located downstream from the source in the IC design;
      disconnecting the intermediate logic from the netlist;
      creating a global route in the IC design between the source and the sink of the net without the disconnected intermediate logic;
      based on creation of the global route, reconnecting the intermediate logic in the netlist; and
      placing the reconnected intermediate logic along the global route.

9. The system of claim 8, wherein the intermediate logic comprises a plurality of latches.

10. The system of claim 9, wherein disconnecting the intermediate logic from the netlist comprises saving a name and a connectivity of each latch of the plurality of latches.

11. The system of claim 9, wherein placing the reconnected intermediate logic along the global route comprises dividing the global route into a number of global route segments corresponding to a number of the plurality of latches.

12. The system of claim 8, wherein the global route extends through available wiring in a hierarchical block of the IC design, and wherein the intermediate logic cannot be placed inside of the hierarchical block.

13. The system of claim 8, wherein placing the reconnected intermediate logic along the global route comprises legalizing placement of the intermediate logic based on slack in the IC design.

14. The system of claim 8, further comprising creating a respective global route for each of a plurality of nets in the IC design.

15. A computer program product comprising a computer readable storage medium having program instructions embodied therewith, the program instructions executable by a processor to cause the processor to perform operations comprising:
   receiving a netlist corresponding to a net in an integrated circuit (IC) design;
   identifying intermediate logic in the net, wherein the intermediate logic is connected between a source and a sink of the net, and wherein the sink is located downstream from the source in the IC design;
   disconnecting the intermediate logic from the netlist;
   creating a global route in the IC design between the source and the sink of the net without the disconnected intermediate logic;
   based on creation of the global route, reconnecting the intermediate logic in the netlist; and
   placing the reconnected intermediate logic along the global route.

16. The computer program product of claim 15, wherein the intermediate logic comprises a plurality of latches.

17. The computer program product of claim 16, wherein disconnecting the intermediate logic from the netlist comprises saving a name and a connectivity of each latch of the plurality of latches.

18. The computer program product of claim 16, wherein placing the reconnected intermediate logic along the global route comprises dividing the global route into a number of global route segments corresponding to a number of the plurality of latches.

19. The computer program product of claim 15, wherein the global route extends through available wiring in a hierarchical block of the IC design, and wherein the intermediate logic cannot be placed inside of the hierarchical block.

20. The computer program product of claim 15, wherein placing the reconnected intermediate logic along the global route comprises legalizing placement of the intermediate logic based on slack in the IC design.

* * * * *